Nov. 27, 1923.
L. C. COLE
1,475,278
PNEUMATIC TOOL HOLDER
Filed Aug. 20, 1921
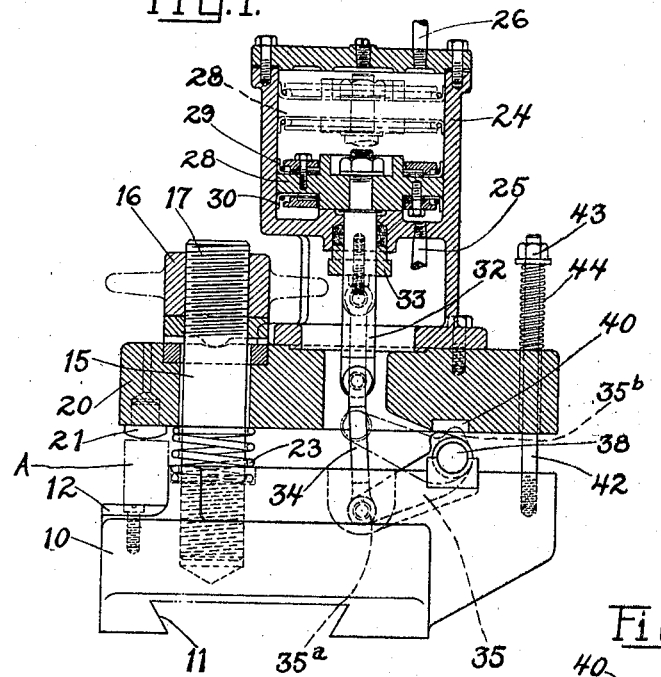
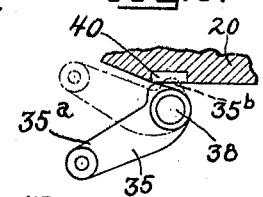
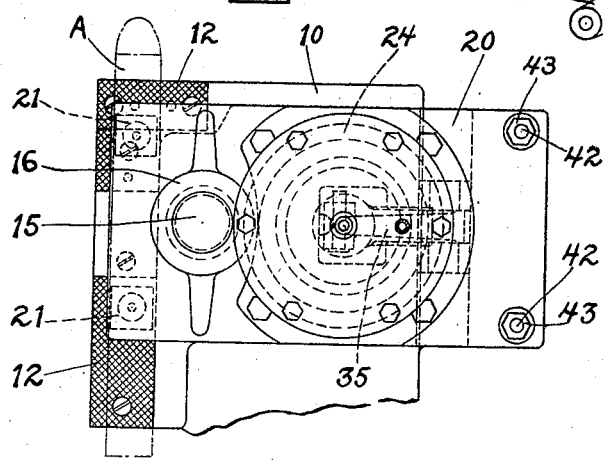
Inventor
L.C. Cole
By Joseph N. Schofield
Attorney Patented Nov. 27, 1923.

1,475,278

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

PNEUMATIC TOOL HOLDER.

Application filed August 20, 1921. Serial No. 493,986.

*To all whom it may concern:*

Be it known that I, LYNDON C. COLE, a citizen of the United States, residing at Hamilton, in the county of Butler and State of Ohio, have invented certain new and useful Improvements in Pneumatic Tool Holders, of which the following is a specification.

This invention relates to tool holders for lathes and other machine tools and particularly to a tool holder adapted to be operated by pneumatic means.

An object of the present invention is to provide an improved tool holder adapted to be operated by pneumatic means to clamp and to unclamp a tool between the cooperating jaws of the holder.

A further object of the invention is to provide a construction which will prevent the tool from becoming unclamped when the air pressure is accidentally released from the pneumatic cylinder. A still further object of the invention is to provide pneumatic means for positively unclamping the tool from the tool holder.

One feature which enables me to accomplish the above mentioned objects is the provision of a double acting cylinder adapted to have either of its ends connected with a source of fluid under pressure, the action of the fluid within the cylinder serving to lower or raise a piston therein.

Another feature which is advantageous is that the upward movement of the piston, which serves to clamp the tool between the jaws of the holder, operates a bell crank lever, a short arm of which is carried by this clamping movement slightly beyond a position normal to the jaws to a self-locking position so that, should the pressure within the cylinder be released, unclamping of the tool will not occur.

With these and other objects in view, my invention consists in the features of construction and operation set forth in the following specification and illustrated in the accompanying drawings.

In the accompanying drawing annexed hereto and forming a part of this specification, I have shown my invention embodied in a tool holder adapted to be mounted on the cross-slide of a lathe, but it will be understood that the invention can be otherwise embodied and that the drawing is not to be construed as defining or limiting the scope of this invention, the claims appended to this specification being relied upon for that purpose.

In the drawing:

Figure 1 is an elevation in section of the complete tool holder.

Fig. 2 is a plan view of the tool holder.

Fig. 3 is a detail view of the bell crank lever.

In the above mentioned drawing I have shown but one modification of the invention which is now deemed preferable, but it is to be understood that changes and modifications may be made within the scope of the appended claims without departing from the spirit of the invention.

Briefly, my invention in its broadest aspect comprises the following principal parts: first, a tool support adapted to be mounted on the cross slide of a lathe; second, a movable jaw member cooperating with the tool support to hold a tool in position; third, means, preferably adjustable, for connecting the tool support and movable jaw member together; fourth, a bell crank lever for tilting the upper jaw about its adjustable connection to clamp and unclamp a tool; fifth, a double acting piston wiithin a suitable cylinder for operating said bell crank lever.

Referring more in detail to the figures of the drawing, the structure consists of a tool support 10 having a dovetail opening 11 on its lower side adapted to fit a corresponding tongue on the cross-slide of a lathe or other machine tool. At one side of this tool support is a hardened steel plate 12 forming one of the jaws of the tool holder. Secured in the tool support is a bolt 15 preferably threaded into the tool support 10 and having a nut 16 engaging threads 17 at its outer end.

Surrounding the bolt is an upper movable jaw member 20 having at one side hardened plates 21 forming a pair of bearing surfaces for the tool holder. These plates 21, as seen in the figures, are directly over the hardened plate 12 in the tool support 10. Between the tool support 10 and the movable jaw member 20 I preferably provide a helical spring 23 which may surround the bolt 15 and hold the movable jaw member 20 in its uppermost position. By adjusting the position of the nut 16 on the upper threaded portion 17 of the bolt 15, the distance between the jaw plates 12 and 21 may be varied within wide limits to adapt the tool holder for different sizes of tools such as shown at A.

Secured to the upper surface of the movable jaw member 20 is a cylinder 24 adapted to have either end of its bore connected with a source of fluid pressure by means of connections 25 and 26 shown in Fig. 1. Within the bore of the cylinder 24 operates a piston 28 which, as shown, is double acting and has packing rings 29 and 30 on its upper and lower faces. Connected to the piston 28 is a piston rod 32 extending through the lower end surface of the cylinder 24 through a suitable stuffing box 33. The lower end of the piston rod 32 is connected to a short connecting rod 34, the opposite end of which is pivotally connected to a bell crank lever 35.

This lever 35, which forms the operating member for clamping and unclamping the jaw 20 of the tool holder, is pivotally mounted about a short shaft 38 resting in bearings provided in the tool support 10. This lever 35, preferably, is in the form as shown in Fig. 3 which comprises a bell crank lever having arms of unequal length. The longer arm 35ᵃ is, as above stated, pivotally connected to the connecting rod 32. The other arm 35ᵇ of this lever is very short and extends approximately at right angles from the longer arm. A bearing plate 40, which may be suitably hardened, is inserted in the lower surface of the movable jaw member 20 in the position engaged by the shorter arm 35ᵇ of the bell crank lever 35.

To hold the free end of the movable jaw member in its lowermost position I secure a bolt 42 in the tool support 10 extending freely through the movable jaw member 20 and having a nut 43 at its outer free end. Between the nut 43 and the upper surface of the movable jaw member 20 I mount a helical spring 44. The effect, therefore, of this spring 44 in connection with the spring 23 surrounding the bolt 15 is to hold the jaws 12 and 21 of the tool holder at a maximum distance apart when the bell crank lever 35 is in its unclamping position.

To operate this tool holder it is only necessary to open a valve connecting the lower end of the cylinder 24 with fluid pressure which causes the piston 28 to move upward. This oscillates the bell crank lever 35 about the center of the short shaft 38 and moves the shorter arm 35ᵇ of the bell crank lever 35 into the position shown in dotted lines in Figs. 1 and 3. Preferably the movement of the piston 32 is sufficient to move this short arm 35ᵇ of the bell crank lever 35 slightly beyond a vertical plane passing through the axis of the shaft 38 so that it is securely locked in position and a failure of pressure within the lower part of the cylinder 24 will not permit the bell crank lever 35 to move to its opposite or unclamping position. To unclamp the tool holder it is only necessary to admit fluid pressure to the upper end of the cylinder 24 which will force piston 28 downward and oscillate the bell crank lever 35 to the position shown in full lines. By the action of the springs 23 and 44, the jaws 12 and 21 are then moved to their open or unclamping position.

What I claim is:

1. A tool holder comprising in combination, a tool support forming the lower fixed jaw of a tool clamp, an upper movable jaw cooperating therewith, means to flexibly connect said movable jaw to the tool support, a bell-crank lever between the tool support and the movable jaw, and pneumatic means to oscillate said bell-crank lever to its extreme position to clamp a tool mounted within said holder, said bell-crank being so formed that when moved to clamping position the movable jaw is held in a self-locking position.

2. A tool holder comprising in combination, a tool support forming the lower fixed jaw of a tool clamp, an upper movable jaw cooperating therewith, means to flexibly connect said movable jaw to the tool support, a bell-crank lever between the tool support and the movable jaw, pneumatic means to move said bell-crank lever to its position to clamp a tool mounted within said holder and to lock said bell-crank lever in clamping position, and pneumatic means to unlock said bell-crank lever and move it to unclamping position to release the tool from said holder.

3. A tool holder comprising in combination, a tool support forming the lower fixed jaw of a tool clamp, an upper movable jaw cooperating therewith, means to flexibly connect said movable jaw member to the tool support, a bell-crank lever between the tool support and the movable jaw member, pneumatic means to move said bell-crank lever to its position to clamp a tool mounted within said holder, said bell-crank lever being moved to a self-locking position, pneumatic means to unclamp said holder, and resilient means forcing said adjustable jaw toward its unclamped position.

In testimony whereof, I hereto affix my signature.

LYNDON C. COLE.